Oct. 23, 1928.

W. G. DOWS

PIPE FITTING 1,688,921

Filed March 11, 1925  2 Sheets-Sheet 1

INVENTOR
Walter G. Dows
BY
ATTORNEY

Oct. 23, 1928.
W. G. DOWS
1,688,921
PIPE FITTING
Filed March 11, 1925
2 Sheets-Sheet 2
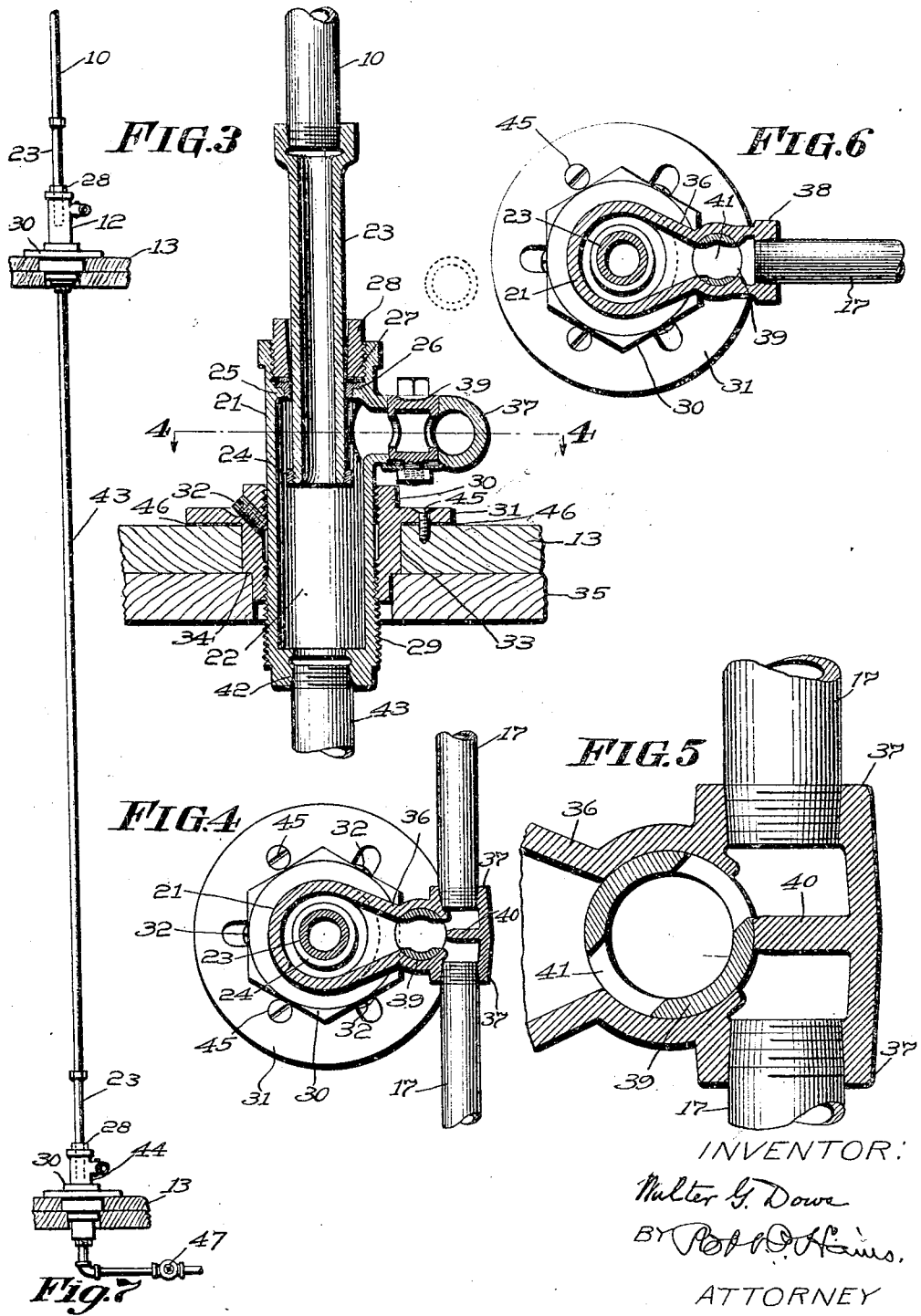
INVENTOR:
Walter G. Dows
BY
ATTORNEY Patented Oct. 23, 1928.

1,688,921

UNITED STATES PATENT OFFICE.

WALTER G. DOWS, OF DORCHESTER, MASSACHUSETTS.

PIPE FITTING.

Application filed March 11, 1925. Serial No. 14,728.

This invention relates to pipe fittings for connecting radiators to supply and return risers.

The radiators of a building are commonly connected to vertical pipes extending upwardly through the successive floors and known as "risers". These risers usually extend from the basement to the top floor of a building, and if the building is high, provision must be made for the change in the length of the risers produced by expansion and contraction.

One feature of the present invention, therefore, resides in a pipe fitting for connecting a radiator to its riser, and which serves also to take care of the expansion and contraction of the pipes of the riser.

This is accomplished in accordance with the present invention by constructing the fitting in the form of a hollow casing having a relatively long pipe-receiving bore into which an end of one of the pipes of the riser may extend a substantial distance, and the casing is provided with a stuffing box or other fluid-tight joint that permits the pipe to slide in the casing as the pipe contracts and expands. This construction serves also to permit one pipe section of a riser to be removed and another installed without disturbing the other pipe sections of the riser, since the sliding joint of the casing will permit the pipe extending into the casing to move in the direction of its length a sufficient amount to allow the other end of this pipe to be secured to a fitting.

In connecting a radiator to a riser it often occurs that the inlet and outlet openings of the radiator are either too high or too low to be easily connected by a valve or elbow to the fitting of the riser, with the result that extra pipe sections or fittings must be inserted, or other expedients resorted to, in making the connection.

Another feature of the invention therefore resides in means for overcoming this difficulty, and in accordance with the present invention the riser is provided with a fitting that may be readily raised and lowered relatively to the radiator, and the fitting is supported in its different positions of adjustment by an adjustable base member that rests on the floor.

The readiness with which the fitting may be raised and lowered to facilitate its connection with a radiator, is due to the fact that while the fitting is rigidly connected to one pipe of a riser (for example the lower pipe), it is slidably connected to the other or upper pipe; that is, while the upper end of a riser pipe is rigidly secured to an adjustable radiator fitting, the lower end of this pipe is slidably secured to a radiator fitting on the floor below, and as a result a fitting and the riser pipe rigidly secured thereto may be raised and lowered as a unit without disturbing the other pipe sections of the riser.

It is sometimes necessary to repair, or change some of the radiators connected to a riser. In order to make such changes heretofore it has been necessary to cut off the supply of heat to the entire riser, but this is objectionable because it prevents heat from being supplied to any of the rooms normally heated by this riser, during the time the repairs are being made.

To overcome this difficulty, another feature of the invention resides in fittings which are provided with plug cocks or valves which may be actuated to cut off the supply of heat to a radiator and its connections while changes are being made.

Many of the radiators now in use are connected to two risers, one being the supply riser and the other the return riser. It is often desirable to position the connection leading from one riser to the radiator, below the connection leading from the other riser. This may be readily done when the adjustable fittings of the present invention are employed, since either fitting may be raised or lowered to clear the radiator connection of the other fitting.

Other features of the invention and novel combination of parts in addition to the above will be hereinafter described in connection with the accompanying drawings, which illustrate good practical forms of the invention.

In the drawings,—

Fig. 3 is a vertical sectional view through one of the fittings of Fig. 2.

Fig. 4 is a sectional view taken on the line 4—4 of Fig. 3.

Fig. 5 is an enlarged sectional view of the plug cock and associated parts, shown in Fig. 4.

Fig. 6 is a view similar to Fig. 4, showing a modification of the invention, having only one outlet, and—

Fig. 7 on a reduced scale shows a pipe of a riser extending from the fitting upon one floor of the building to the fitting upon the next floor.

Figure 1:
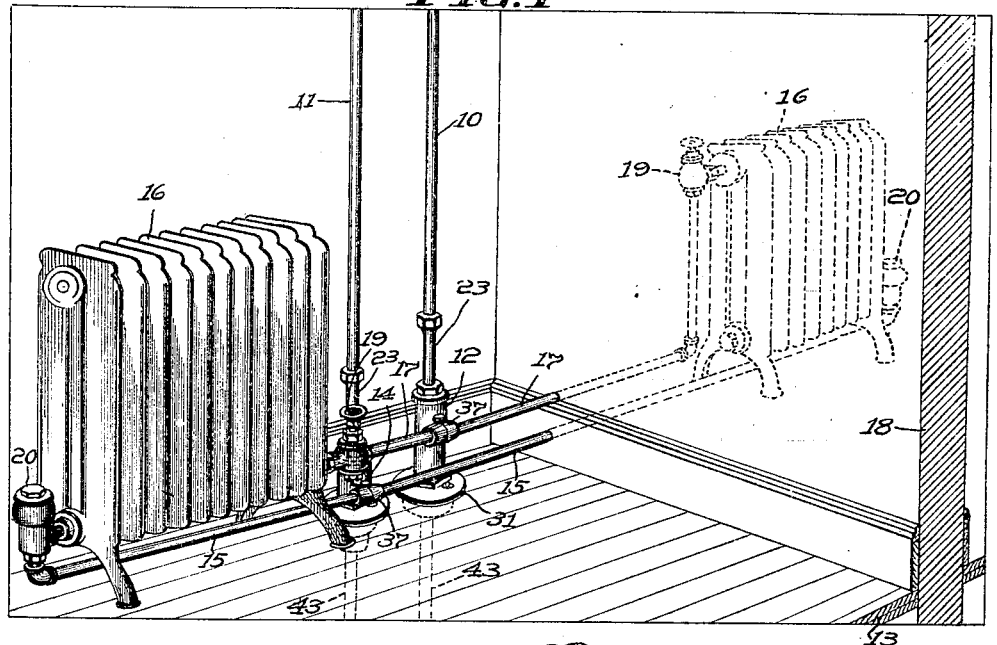
Fig. 1 is a perspective view showing a portion of a room in which a radiator is connected to its risers in accordance with the present invention, a second radiator of an adjoining room being shown in dotted lines.
Figure 2:
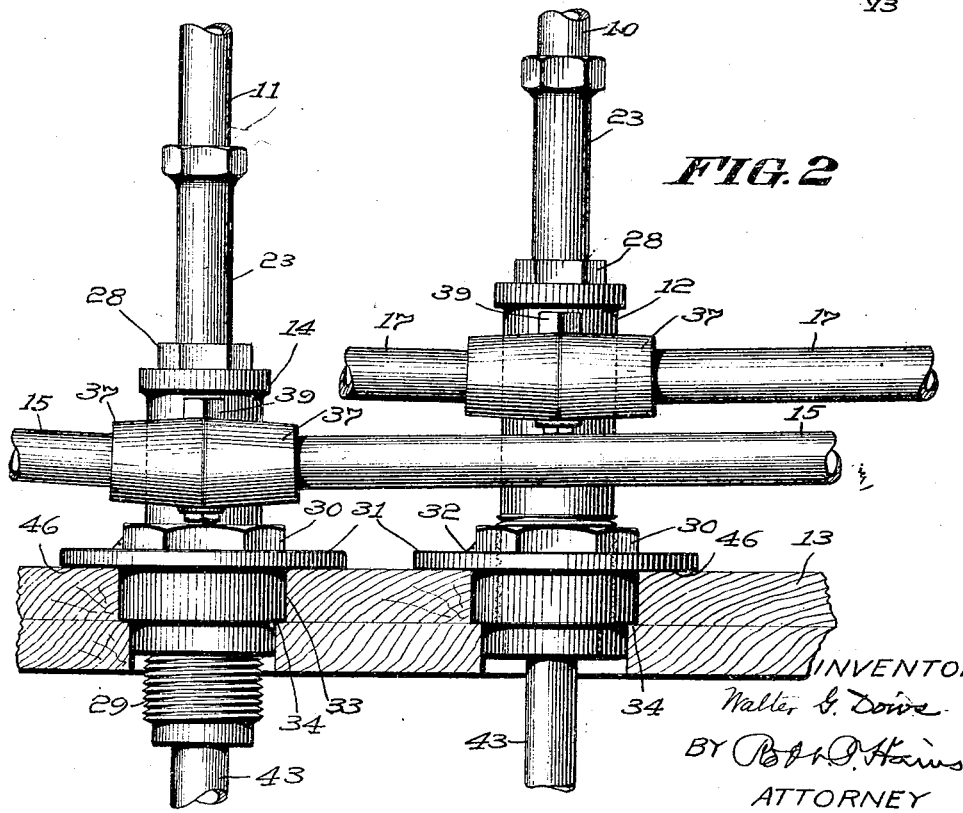
Fig. 2 is an enlarged side elevation of the fittings and portions of the risers shown in Fig. 1.

Referring to Figs. 1 and 2, 10 may be regarded as the supply riser and 11 as the return riser. The supply riser 10 is shown as provided with a fitting 12 which is supported in its raised position upon the floor 13 of the room, and the return riser 11 is shown as provided with a similar fitting 14, which has been lowered so that the connections 15 extending from the fitting 14 to the radiators 16 will lie below the connections 17 leading from the fitting 12 to these radiators.

In the construction shown in Figs. 1 and 2, it is assumed that two radiators in different rooms, separated by a wall 18, are connected to the risers by the fittings 12 and 14. However, if only one radiator is to be connected to these fittings, one of the connection receiving nipples of each fitting may be plugged up or shut off, or a somewhat different type of fitting may be employed, as shown in Fig. 6. Each of the radiators 16 is shown as provided with the usual valve 19 by which the supply of heating fluid may be turned on or off as desired, and each radiator is provided with the usual steam trap 20.

When the risers 10 and 11 extend upwardly through a number of different floors, it is necessary to provide means for taking care of the expansion and contraction of these pipes, and, in accordance with the present invention, each fitting is given the form of a hollow casing 21 having a relatively long pipe receiving bore 22 into which an end of one of the pipes of a riser may extend a substantial distance. In the present case each riser is shown as having a sleeve 23 secured to the end of a pipe 10 or 11, to extend into the fitting through the stuffing box to be described. This is desirable since the sleeve may be formed of a pipe having a smoother and more uniform exterior surface than the ordinary riser pipe, but, if desired, the sleeve may be omitted and an end portion of the riser pipe 10 or 11 may be inserted in the bore 22 of the fitting.

When the sleeve 23 is employed it may be desirable to provide means for preventing the sleeve from being pulled out of its fitting after the complete fitting has left the factory, and before or after it has been installed in a building. To this end the lower end of the sleeve 23 is provided with a collar 24 which may be threaded upon the sleeve, and then brazed, welded or otherwise permanently secured thereto. The hollow casing 21 is provided with an inwardly extending annular flange 25 having an opening therethrough of sufficient size to permit the passage of the collar 24 upon the inner end of the sleeve 23. A ring 26, preferably formed of metal, is placed in the casing 21 upon the flange 25, to prevent the packing 27 from being forced downwardly in the space between the bore of the flange 25, and the sleeve 23, and the packing is pressed downwardly against the ring 26 by the gland nut 28. This form of stuffing box provides a tight joint which will prevent the escape of steam or hot water about the sleeve 23, while at the same time it will permit sliding movement of the sleeve within the casing 21.

As stated, one important feature of the present invention resides in the means by which the fittings 12 and 14 may be raised and lowered to facilitate the connection of a fitting to a radiator. In order to support the fittings in the desired elevated position, the cylinder casing 21 of each of these fittings has its outer surface threaded as at 29, upon which a nut or internally threaded sleeve 30 is adjustably mounted, and the nut or sleeve 30 is provided with a laterally extending flange 31 which rests upon the floor 13 of the building. As a result of this construction the sleeve 30 may be rotated upon the casing 21 for adjustment lengthwise thereof, and the casing and sleeve are preferably so constructed that a relatively long range of adjustment may be secured. After the fitting 30 has been rotated upon the casing 21 to the desired position of adjustment it may be locked in the adjusted position by one or more set screws 32 carried by the nut or sleeve 30. The sleeve 30 is provided below the flange 31 with an annular portion 33 which is adapted to fit a hole in the floor, and the lower portion of the sleeve is preferably provided with a shoulder 34 adapted to rest on the lower flooring boards 35, and has a reduced portion which centers the fitting in the hole in the lower floor. This is desirable in order that the shoulder 34 resting upon the boards 35 shall support the fitting at the desired height before the finished floor is laid. In order to connect the fitting to a radiator, the casing 21 is provided with a laterally extending neck 36 and this neck is shown in Figs. 1 to 5 inclusive as provided with oppositely extending nipples 37. This construction is desirable when two radiators are to be connected to a single casing 21. If, however, only one radiator is to be connected to a casing, the modified construction of Fig. 6 may be employed in which the neck 36 is provided with a single nipple 38.

After the heating system has been installed in a building, it may be desirable to remove or make changes in certain radiators. Heretofore, before this could be done, it has been necessary to cut off the supply of heat to the entire riser to which the radiator was connected, thus cutting off heat to all other radiators which were supplied by this particular riser. To overcome this difficulty the fitting of the present invention may be provided with a plug cock 39 mounted in the neck 36 of the casing, which may be operated to cut off the supply of heat to either or both of the radiators 16. To this end the neck 36, as best shown in Figs. 4 and 5, is provided with a bridge piece 40 which is positioned to prevent steam or water from flowing directly from one nipple 37 to the other. This bridge piece serves also to cooperate with the plug cock 39, whereby the supply of heat may be cut off from one radiator 16, without cutting off the supply of heat to the other radiator.

The plug cock 39 is shown as having a transversely extending passage 41 through which the hot water or steam may pass to the connections leading to the radiators, and it will be seen that when the cock 39 is turned to the position shown in Fig. 4, heat will be supplied to both the radiators 16; whereas, when the cock is positioned as shown in Fig. 5, heat will be cut off from one of the radiators, but not the other, and if the cock is turned through a further angle, it will cut off the supply of heat to both radiators. The upper end of this cock is preferably squared, as shown, to receive a wrench or other tool adapted to turn the cock.

The adjustability of the hollow casing 21 by which it may be raised or lowered to accommodate a connection extending from the fitting to a radiator is due not only to the adjustable supporting nut or sleeve 30, but also to the manner in which this fitting is secured to a pair of aligned pipes of a riser.

In the construction shown, the lower end of the cylinder casing 21 is provided with a threaded socket 42 adapted to receive the upper threaded end of a pipe 43 of a riser, and the pipe 43 is screwed rigidly into the socket 42 to make a tight joint, and so that when the fitting or hollow casing 21 is raised or lowered, the entire pipe 43 will also be raised or lowered. This is possible because the lower end of the pipe 43 extends slidably into a fitting 44 (see Fig. 7), mounted upon the floor below the upper fitting 12, but which is similar in construction to the fittings 12 and 14. In other words, the construction is such that each pipe of a riser has one end rigidly secured to a hollow casing 21, while the opposite end of this pipe is slidably secured to a second hollow casing 21. This construction serves not only to take up the expansion and contraction of each of the pipe sections forming a riser, but permits any one of the casings 21 of the entire riser to be raised and lowered as desired, without disturbing the operation of the riser.

The pipes 15 and 17 which form the connections between the radiators and the fittings 12 and 14 should be arranged so that they will drain quickly to avoid water lying in these pipes, when steam is employed as the heating medium, and to promote flow of water, when hot water is used as the heating medium. The pipes 15 and 17 are therefore shown as inclined slightly to the horizontal, so that the ends of these connectors which are secured to the fittings are lower than the ends of the connectors which are secured to the radiators, as will be apparent from Figs. 1 and 2.

In case a radiator is connected to both a supply riser 10 and return riser 11, as shown in Fig. 1, it is frequently desirable to position one connecting pipe below the other. This may be readily accomplished when fittings constructed in accordance with the present invention are employed, since the adjustable supporting means shown permits one fitting to be raised and the other lowered sufficiently to permit one set of pipes to lie directly below the other pipes, as will be apparent from Figs. 1 and 2. The supporting nuts or sleeves 30 may be secured to the floor by the screws 45.

Each riser 10 and 11 is preferably provided with a valve 47 at one end for controlling the supply of heating fluid to the entire riser. This is desirable because the present construction is such that if the supply of heating fluid is shut off from a riser any riser section may be removed, in the manner above pointed out, without disturbing the fittings or other sections of the riser.

It may be desirable to form a tight joint between the fitting supporting bracket 30 and floor, so that water upon the floor, due to radiator leakage, washing the floor, or to fire, will not pass downwardly thru the riser opening in the floor. This may be accomplished by providing a gasket 46 that is confined between the flange 31 and the floor to form a tight joint between them, and graphite paste or the like may be placed upon the threads of the sleeve 30 to prevent water from passing downwardly between the cooperating threads.

What is claimed is:—

1. In combination with a riser for heating fluids, a hollow casing constructed to form a connection between two sections of the riser and having a threaded outer surface, a neck leading from one side of the casing and adapted to be connected to a branch pipe, an internally threaded sleeve adjustably engaging the threads of the casing and having a centering portion adapted to fit a hole in the floor and center the casing, a laterally extending flange upon the sleeve that rests upon the floor, and the sleeve being adjustable lengthwise of the casing to raise and lower the latter.

2. In combination with a riser for heating fluids, a hollow casing constructed to form a connection between two sections of the riser, and having a threaded portion, a neck leading from one side of the casing and adapted to be connected to a branch pipe, an internally threaded sleeve that fits the threaded portion of the casing, a shoulder upon the sleeve for resting upon the subfloor of a building, a laterally extending flange that rests upon the floor, the sleeve being adjustable lengthwise of the casing to raise and lower the latter.

3. In combination with a riser for heating fluids, a hollow casing constructed to form a connection between two sections of the riser and having a threaded outer surface, a neck leading from one side of the casing and adapted to be connected to a branch pipe, an internally threaded sleeve that fits the threaded portion of the casing and having a lateral flange that rests on the floor, the sleeve being adjustable lengthwise of the casing to raise and lower the latter, and means for locking the sleeve to the casing in the desired position of adjustment.

4. In combination with a riser for heating fluids, a pipe fitting comprising a hollow casing adapted to form a connection between two aligned sections of the riser, means for connecting an end of one of said sections to the casing for sliding adjustment of one lengthwise of the other, means for rigidly securing an end of the other section to the casing so that the casing and second section may be raised and lowered as a unit relative to the first section, and means for supporting the casing from the floor in different positions of adjustment.

5. In combination with a riser for heating fluids, pipe fittings for the riser and each comprising a hollow casing adapted to form a connection between two sections of the riser, means for connecting an end of one of said sections to one of the casings for sliding adjustment of the casing relatively to the section, means for rigidly securing the opposite end of said section to a second casing so that the second casing and section rigidly secured thereto may be raised and lowered as a unit while the opposite end of said section slides in the first casing and floor engaging means for adjustably supporting each casing from a different floor of the building in which the riser is installed.

6. In combination with a riser for heating fluids, pipe fittings for the riser each comprising a hollow casing adapted to form a connection between two sections of the riser, means for connecting an end of one section to one of the casings for sliding adjustment of the casing relatively to the section, means for rigidly securing the opposite end of said section to a second casing so that the second casing and section rigidly secured thereto may be raised and lowered as a unit while the opposite end of said section slides in the first casing, and means for supporting each casing from a different floor of the building in which the riser is installed.

7. A riser for heating fluids comprising in combination, a plurality of pipes forming riser sections, fittings each comprising a hollow casing adapted to form a connection between two aligned pipes of a riser, means independent of the riser for supporting said fittings, and each fitting having a relatively long pipe receiving bore so that one riser section may be lowered into a fitting far enough to permit its removal from the riser without disturbing the position of the installed fittings.

8. In combination with a riser for heating fluids, a pipe fitting comprising, a hollow casing adapted to form a connection between two aligned sections of the riser and having a threaded outer surface, a neck extending laterally from the casing and adapted to be connected to a branch pipe, a nut engaging the threads formed around the casing and provided with a flange adapted to rest upon the floor to support the casing, and the nut being adjustable to raise and lower the casing.

9. In combination with a riser for heating fluids, a pipe fitting comprising, a hollow casing constructed to form a connection between two aligned sections of the riser and having a threaded outer surface, a nut mounted upon the threaded portion of the casing and provided with a flange adapted to rest upon the floor to support the casing, and the nut being adjustable upon the casing to raise and lower the latter.

10. In combination with a riser for heating fluids, a pipe fitting comprising, a hollow casing constructed to form an expansion connection between two aligned sections of the riser and having one section rigidly secured to the casing and the other section slidingly secured thereto, a neck extending laterally from the casing and adapted to be connected to a branch pipe, a nut threaded upon said casing and provided with a flange adapted to rest upon the floor to support the casing, and the nut being adjustable to raise and lower the casing.

11. In combination with a riser for heating fluids, a pipe fitting comprising, a hollow casing adapted to form a connection between two aligned sections of the riser and having a relatively long, pipe-receiving bore, one of said sections having an end portion which may be inserted in said bore a substantial distance to permit lengthwise movement of the section in said casing during installation of the riser, a fluid-tight joint between the casing and said end portion for permitting sliding movement of the end portion in the casing to accommodate expansion of said pipe, a neck extending laterally from the casing and adapted to be connected to a branch pipe, and a floor engaging flange plate for supporting said casing from the floor.

12. In combination with a riser for heating fluids, a pipe fitting comprising, a hollow casing adapted to form a connection between two aligned sections of the riser and having a relatively long, pipe-receiving bore, one of said sections having an end portion which may be inserted in said bore a substantial distance to permit lengthwise movement of the end portion in said casing during installation of the riser, a fluid-tight joint between the casing and said end portion for permitting sliding movement of the end portion in the casing to accommodate expansion of said section, a neck extending laterally from the casing and adapted to be connected to a branch pipe, and a floor engaging flange plate having threaded engagement with the outer wall of said casing and adjustable to raise and lower the casing.

13. In combination with a riser for heating fluids, a hollow casing adapted to form a connection between two aligned sections of the riser, a neck formed integral with the casing and having a pair of oppositely disposed nipples adapted to be connected to branch pipes, a bridge piece in said neck for preventing fluid from passing directly from one nipple to the other, and a flange upon said casing for supporting it from the floor.

14. In combination with a riser for heating fluids, a hollow casing constructed to form a connection between two sections of the riser and having a threaded outer surface, a neck leading from the casing and adapted to be connected to a branch pipe, a relatively long internally threaded sleeve adjustably engaging the threads of the casing, a laterally extending flange upon the sleeve and adapted to rest on the floor to support the casing, and said sleeve being adjustable lengthwise of the casing throughout a substantial distance to raise and lower the casing throughout a pronounced range.

15. In combination with a riser for heating fluids, a pipe fitting comprising, a hollow casing adapted to form a connection between two aligned sections of the riser, an integral neck extending laterally from said casing and adapted to be connected to a branch pipe, a plug cock mounted in said integral neck and operable to control the flow of fluid though said branch pipe, and means for supporting said casing from a floor of the building in which the riser is installed.

16. In combination with a riser for heating fluids, a pipe fitting comprising, a hollow casing adapted to form a connection between two aligned sections of the riser, an integral neck extending laterally from said casing and having a pair of nipples adapted to be connected to branch pipes, a plug cock mounted in said integral neck and operable to close the passage to either or both of said nipples to control the flow of fluid through said branch pipes, and means for supporting said casing from a floor of the building in which the riser is installed.

17. In combination with a riser for heating fluids, a pipe fitting comprising, a hollow casing adapted to form a connection between two aligned sections of the riser, an integral neck extending laterally from said casing and having a pair of nipples adapted to be connected to branch pipes, a bridge piece in said neck for preventing fluid from passing directly from one nipple to the other, and a plug cock mounted in said neck in position to cooperate with the bridge piece and adjustable to close the passage to either or both of said nipples to control the flow of fluid through said branch pipes.

18. In combination with supply and return risers mounted side by side, a pipe fitting for each riser, each fitting comprising a hollow casing adapted to form a connection between two aligned sections of a riser, a neck extending laterally from each casing and adapted to be conneted to a branch pipe, a nut threaded upon each casing for adjustment lengthwise thereof and having a floor engaging flange adapted to adjustably support the casing from the floor, and said supporting nuts being adjustable through a sufficient range to permit each casing to be moved up or down and supported so that the branch pipe connected to one neck will lie directly over the branch pipe connected to the other neck.

19. In combination with supply and return risers mounted side by side, a pipe fitting for each riser, each fitting comprising a hollow casing adapted to form a connection between two aligned sections of a riser, a neck extending laterally from each casing and provided with nipples adapted to be connected to branch pipes, a nut threaded upon each casing for adjustment lengthwise thereof and having a floor engaging flange adapted to support the casing at different elevations, and said supporting nuts being adjustable through a sufficient range to permit each casing to be elevated or lowered and supported from the floor so that the branch pipes connected to one neck will lie directly over the branch pipes connected to the other neck.

In testimony whereof, I have signed my name to this specification.

WALTER G. DOWS.